United States Patent [19]

Piccinini et al.

[11] 3,959,316

[45] May 25, 1976

[54] PROCEDURE FOR PROPYLENE OXIDE SYNTHESIS

[75] Inventors: Carlo Piccinini; Morello Morelli; Pierluigi Rebora, all of San Donato Milanese, Italy

[73] Assignee: Snam Progetti S.p.A., San Donato Milanese, Italy

[22] Filed: May 14, 1974

[21] Appl. No.: 469,895

Related U.S. Application Data

[63] Continuation of Ser. No. 339,938, March 9, 1973, abandoned.

[30] Foreign Application Priority Data

May 13, 1972 Italy .................................. 21767/72

[52] U.S. Cl. .......................................... 260/348.5 R
[51] Int. Cl.² ....................................... C07D 301/10
[58] Field of Search ............................ 260/348.5 R

[56] References Cited
FOREIGN PATENTS OR APPLICATIONS

| | | |
|---|---|---|
| 717,201 | 2/1942 | Germany |
| 397,161 | 8/1933 | United Kingdom |
| 451,130 | 7/1936 | United Kingdom |
| 913,703 | 12/1962 | United Kingdom |
| 960,332 | 6/1964 | United Kingdom |

OTHER PUBLICATIONS

P. W. Sherwood, The Oil and Gas Journal, Oct. 7, 1957, pp. 150–153.

K. E. Murray, Australian J. Sci. Research, Vol. 3A (1950), p. 448.

*Primary Examiner*—Norma S. Milestone
*Attorney, Agent, or Firm*—Ralph M. Watson

[57] ABSTRACT

The preparation of propylene oxide by means of direct oxidation of propylene with oxygen or air in the presence of silver based catalysts is characterized by carrying out the reaction in the presence of water vapor in a quantity between 2 and 25%.

3 Claims, No Drawings

PROCEDURE FOR PROPYLENE OXIDE SYNTHESIS

This is a continuation of application Ser. No. 339,938, filed Mar. 9, 1973, and now abandoned.

The present invention relates to an improved procedure for the production of propylene oxide.

The preparation of alkylenic oxides starting from olefine and oxygen in the presence of catalysts consisting mainly of silver and/or silver oxides is known.

In particular industrial processes for the synthesis of the ethylene oxide from ethylene and oxygen or air have been developed and marketed for a long time, whereas up to now interesting results, from the industrial point of view, for the similar synthesis of higher alkylenic oxides, particularly propylene oxide which is mainly produced indirectly, have not been forthcoming.

In French Pat. No. 785,149 it is proposed to produce propylene oxide from propylene and oxygen with catalysts based on silver by feeding large quantities of inert compounds, in particular carbon-di-oxide or water vapour together with the reagents.

The results obtained with the procedure of the above reported patent however are not satisfactory from the industrial point of view.

It has now been found that it is possible to obtain highly selective propylene oxide when between 2 and 25% by volume of water vapor is added to the reaction mixture.

It has been found that a quantity of water vapor higher than 30% not only improves propylene oxide selectivity but also produces a clear cut reduction of the latter.

The procedure of the present invention envisages the introduction of propylene, air or oxygen and water vapour over a silver based catalyst in a reactor maintained at a temperature in the range between 110° and 400°C.

The feed gas is made up of propylene and oxygen or air in a relative ratio between 4:96 and 95:5. The quantity of water vapour can be between 2 and 25% with respect to the total of the feed gas and is preferably between 2 and 15%.

In the feed gas, gaseous compounds which do not influence the reaction negatively can be present. Silver based catalysts which can be used with advantage in the practice of our invention are those based on metallic silver or silver compounds.

That catalyst can also contain lesser quantities of other elements as activators such as Magnesium, Calcium, Barium, Strontium, Selenium, Tellurium, Lead, Tin, Arsenic and similar elements or compounds.

The catalyst can be used as such or supported on a Silicate of Allumina (china clay), Carborundum, Kieselgur or similar support.

It will be appreciated that it is possible to introduce a suitable inhibitor which regulates the reaction rate, before or during the reaction of propylene oxide synthesis. Inhibitors which can be used with advantage can be chosen from the organic or inorganic chlorides.

The examples which follow illustrate the invention:

EXAMPLE 1

Two tests were carried out at a constant temperature without and with 5% $H_2O$ in feeding on a catalyst prepared in the following way:

100g. of $AgNO_3$, 24g. of calcium nitrate tetrahydrate and 11g. of barium nitrate were dissolved in 1500c.c. of deionized water (ratio Ag:Ca:Ba = 15:2.5:1).

The solution obtained which can be opalescent due to the presence of a small quantity of silver chloride formed was filtered with adsorbent media.

42g. of anhydrous sodium carbonate were dissolved in 500c.c. of distilled water and purified with the addition of 2g. of silver nitrate.

The solution obtained was filtered. Before the two solutions were mixed a small quantity of calcium chloride was added (~ 10mg.). The coprecipitation of silver, calcium and barium carbonate was carried out by adding, under rapid agitation the solution of sodium carbonate to the solution of nitrates.

The carbonate precipitation was obtained in a finely divided state.

The material obtained was filtered, washed with deionized water and dried for several hours in an oven at 110°C. with a weak air flow. About 120g. of catalytic powder was obtained which was finely ground in a hammer mill. The placing of the catalytic material on the support then proceeded.

A commercial material was chosen as a support, that is silicate of allumina (china clay) with the following characteristics (allumina S.A. 5218 of Norton)

Shape: as a sphere, diameter 5/16 inch

Composition:

| $Al_2O_3$ | 85.50 | $TiO_2$ | 0.10 | $Na_2O$ | 0.03 |
|---|---|---|---|---|---|
| $SiO_2$ | 12.40 | $MgO$ | 0.60 | $K_2O$ | 0.50 |
| $Fe_2O_3$ | 0.20 | $CaO$ | 0.40 | | |

Chemical-physical characteristics (R.X.)-$\alpha Al_2O_3$ + Mullite.

Porous structure; porosity in volume
pore radius: 100–700 microns

This support provides a particularly suitable porous structure in that it allows a complete penetration of the catalytic material, even in the internal parts of the sphere. It will be appreciated that other types of alumina and supports having the same properties can be used.

Inhibition was carried out by mixing the catalytic powder obtained with 800g. of a solution of ethylene glycol and treating the suspension with 550g. of support maintained under agitation to facilitate inhibition uniformity.

The material obtained was then dried and activated in a controlled airflow at around 350°C. for a few hours. This catalyst, in order to carry out the mentioned test, was loaded in a 30cm. long reactor, diameter 1 inch thermostatically controlled by dowtherm circulation.

Test conditions were as follows:

pressure = atmospheric
Catalyst volume = 100cm$^3$
Flow = 5Nl/h
Ratio $C_3H_6/O_2$ = 85/15
Test results are reported in table 1.

EXAMPLE 2

The same reactor as in example 1 was used; the active part of the catalyst consisted of Ag alone and the 10mg. of $CaCl_2$ were not added. The test results and the reaction conditions are reported in table 1.

EXAMPLE 3

The same reactor as in example 1 was used; the active part of the catalyst was prepared starting from 100g. $AgNO_3$ and 32.4g. of $Ca(NO_3)_2$ $4H_2O$.

$CaCl_2$ was not used. The test results and reaction conditions are reported in table 1.

EXAMPLE 4

The same reactor of example 1 was used; the active part of the catalyst was prepared starting from 100g. of $AgNO_3$ and 35.9g. pf $Ba(NO_3)_2$, $CaCl_2$ was not used. Test results and operating conditions are reported in table 1.

EXAMPLE 5

Another catalyst was prepared through the method which starts from solutions. It consisted in the preparation of organic silver salts and eventually promotors (preferably lactates, were prepared) and then the impregnations of the supports with such solutions, was proceeded with. The temperature was maintained at about 90–95°C. during the operation with a variable duration depending on the type of support; however, not more than an hour afterwards the solution was removed and the impregnated material was still maintained at 90°–95°C. for about 15mins.

The material was then placed in the oven at 70°–80°C. in a weak air flow for about 12 hours; a calcination at 320°C. for about 5 hours in a controlled air flow followed. The test was carried out in the same reactor as example 1. The catalyst was prepared starting from 100g. of Ag (lattato...) and 0.8g. Ba (lattato...). The support consisted of allumina in spheres of a diameter equal to 3/16 inch. Test results and operating conditions are reported in table 1.

EXAMPLE 6

40g. of the powder making up the active part of the catalyst described in example 1 were loaded in a glass reactor of 1 diameter which was heated by means of a dowtherm circulation. Some tests were carried out on this catalyst with constant temperature and different $H_2O$ content. The conditions under which the tests were carried out were as follows:

Pressure = atmospheric
Temperature = 184°C.
Reagent mixture flow = 5N1/h
Ratio $C_3H_6/O_2$ = 85/15

The results obtained are reported in table 2.

EXAMPLE 7

Tests of propylene oxide synthesis from propylene and oxygen were carried out using a catalyst made up of silver powder, with different water contents in the gas feed.

The reactor used was the same as in previous examples and the reaction conditions were as follows:

Pressure = atmospheric
Reagent mixture flow = 5N1/h
T°C = 181
Molar ratio $C_3H_6O_2$ = 85/15

The test results are summarized in table 3.

Table 1

| Example n., | Atomic ratio Ag/Ca/Ba | Feed $C_3H_6/O_2$ (% mols) | T°C. | S % mol. (selectivity) | |
|---|---|---|---|---|---|
| | | | | without $H_2O$ | with $H_2O$ |
| 1 | 15/2.5/1 | 85/15 | 195 | 24.4 | 50.0 |
| 2 | 15/0/0 | 85/15 | 215 | 6.0 | 21.0 |
| 3 | 15/3.5/0 | 85/15 | 193 | 8.9 | 24.5 |
| 4 | 15/0/3.5 | 85/15 | 195 | 12.0 | 23.5 |
| 5 | 1400/0/7.9 | 85/15 | 210 | 3.5 | 7.0 |

Table 2

| % $H_2O$ | Selectivity % mol. |
|---|---|
| 0 | 35 |
| 4 | 52 |
| 5 | 49 |
| 8 | 49 |
| 12 | 51 |
| 14 | 45 |
| 33 | 37 |
| 47 | 18 |

Table 3

| % $H_2O$ | Selectivity % mol. |
|---|---|
| 0 | 30.5 |
| 6.5 | 41.6 |
| 17.5 | 34.4 |
| 48.5 | 10 |

What we claim is:

1. A vapor phase reaction for the production of propylene oxide which comprises oxidizing propylene in the presence of a silver based catalyst and an atmosphere that consists essentially of oxygen or air, and from 2 to 25% by volume of water vapor at a temperature of from 110° to 400°C.

2. A vapor phase reaction as defined in claim 1 wherein the silver based catalyst includes calcium and barium at an atomic ratio of 15:2.5:1.

3. A vapor phase reaction as defined in claim 2 wherein the water vapor content is between 2 and 15% by volume.

* * * * *